(12) United States Patent
Arora et al.

(10) Patent No.: US 7,519,225 B2
(45) Date of Patent: Apr. 14, 2009

(54) IMAGE PROCESSING METHOD AND APPARATUS FOR EXTRACTING AN IMAGE

(75) Inventors: Prateek Arora, Bangalore (IN); Pinaki Ghosh, Bangalore (IN); Amit Saxena, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 784 days.

(21) Appl. No.: 10/614,316

(22) Filed: Jul. 7, 2003

(65) Prior Publication Data
US 2004/0028275 A1 Feb. 12, 2004

(30) Foreign Application Priority Data
Jul. 8, 2002 (JP) ............................. 2002-198645

(51) Int. Cl.
G06K 9/68 (2006.01)
G06K 9/00 (2006.01)
(52) U.S. Cl. ...................................... 382/218; 382/128
(58) Field of Classification Search ......... 382/128–132, 382/209, 218, 294
See application file for complete search history.

(56) References Cited

U.S. PATENT DOCUMENTS

| | | | |
|---|---|---|---|
| 5,623,560 A * | 4/1997 | Nakajima et al. ............ 382/295 |
| 6,026,142 A | 2/2000 | Gueziec et al. |
| 6,201,888 B1 | 3/2001 | Kalvin |
| 6,462,342 B1 | 10/2002 | Stearns |
| 6,560,354 B1 * | 5/2003 | Maurer et al. ............... 382/131 |
| 6,574,356 B1 | 6/2003 | Lee et al. |
| 7,106,891 B2 * | 9/2006 | Wyman et al. .............. 382/128 |
| 7,142,700 B2 * | 11/2006 | Van Vaals ................... 382/128 |
| 2001/0031082 A1 | 10/2001 | Numaoka |
| 2001/0038386 A1 | 11/2001 | Numaoka |
| 2002/0076106 A1 | 6/2002 | Kondo et al. |
| 2002/0081008 A1 | 6/2002 | Wollenweber |
| 2002/0081009 A1 | 6/2002 | Licato et al. |
| 2002/0122575 A1 | 9/2002 | Vaisburd et al. |
| 2003/0004405 A1 | 1/2003 | Townsend et al. |

FOREIGN PATENT DOCUMENTS

JP 06-165036 * 6/1994

OTHER PUBLICATIONS

Ayala et al., Spatial Size Distributions: Applications to Shape and Texture Analysis, IEEE, Dec. 2001, pp. 1430-1442.*
U.S. Patent Application of Wollenweber et al., for "Methods and Apparatus for Improving Image Quality," U.S. Appl. No. 10/371,552, filed Feb. 21, 2003.

* cited by examiner

Primary Examiner—Wesley Tucker
(74) Attorney, Agent, or Firm—Armstrong Teasdale LLP

(57) ABSTRACT

An object of the present invention is to extract an image closest to a reference image from among a plurality of candidate images. A plurality of candidate images similar to the reference image are extracted from a plurality of images by utilizing granulometry. The plurality of candidate images is transformed based on the reference image. Mutual information shared by each of the transformed candidate images and the reference image is calculated. A candidate image sharing the largest amount of mutual information with the reference image is selected from among the plurality of candidate images.

8 Claims, 5 Drawing Sheets

IMAGE PROCESSING METHOD AND APPARATUS FOR EXTRACTING AN IMAGE

CROSS REFERENCE TO RELATED APPLICATIONS

This application claims the banefit of Japanese Application No. 2002-198645 Filed Jul. 8, 2002.

BACKGROUND OF THE INVENTION

The present invention relates to an image processing method and apparatus, and more particularly, to a method and apparatus for extracting an image, which meets a predetermined condition, from among a plurality of images.

Medical images are helpful in diagnosing a patient condition. Medical images provide unique information depending on what modality is used to produce the medical images. Medical images produced by an appropriate modality are employed according to a purpose of diagnosis.

In order to given more appropriate diagnosis on the basis of diverse information, a plurality of kinds of medical images produced by a plurality of modalities, such as, an X-ray computed tomography (CT) apparatus, a magnetic resonance imaging (MRI) apparatus, and a positron emission tomography (PET) apparatus or a single photon emission computed tomography (SPECT) apparatus are employed.

For example, the X-ray CT apparatus and PET apparatus are used to image the same region of the same patient. Images produced by the X-ray CT apparatus and showing the structure of the cerebral parenchyma, and images produced by the PET apparatus and showing the active state of the brain are used to diagnose a lesion in terms of the structure of the lesion and the function thereof. At this time, a synthetic image produced by superposing two different kinds of images in order to facilitate simultaneous grasping of the structure and function.

In order to produce such a synthetic image, two images are aligned with each other. The alignment may be referred to as registration. The registration is performed by a computer.

For the registration, a technique described in, for example, "Multi-modal Volume Registration by Maximization of Mutual Information" written by W. M. Wells III et al. is adopted.

Generally speaking, the registration is achieved through transformation through which the amount of mutual information and a candidate image v(x) shares with a reference image u(x) is maximized. Namely, $$\hat{T} = \arg\max_{T} I(u(x), v(T(x))) \quad (1)$$

where T denotes the transformation from the apparatus of coordinates for the candidate image to the apparatus of coordinates for the reference image.

$$I(u(x), v(T(x))) \quad (2)$$

The formula 2 denotes mutual information.

$$I(u(x), v(T(x))) = h(u(x)) + h(v(T(x))) - h(u(x), v(T(x))) \quad (3)$$

where h(•) denotes an entropy.

$$h(x) = -\int p(x) \ln p(x) dx \quad (4)$$

$$h(x,y) = -\int p(x,y) \ln p(x,y) dx dy \quad (5)$$

The above formulae provide an entropy.

The foregoing registration proves effective when it is previously apparent that two images result from visualization of the same region. Otherwise, even if transformation provides an image that shares the largest amount of mutual information with a reference image, the transformation does not always lead to significant registration.

SUMMARY OF THE INVENTION

Therefore, an object of the present invention is to provide a method and apparatus for extracting an image closest to a reference image from among a plurality of candidate images.

(1) According to one aspect of the present invention attempting to solve the aforesaid problem, there is provided an image processing method for: extracting a plurality of candidate images similar to a reference image from among a plurality of images by utilizing granulometry; transforming the plurality of candidate images on the basis of the reference image; calculating mutual information shared by each of the transformed candidate images and the reference image; and selecting a candidate image, which shares the largest amount of mutual information with the reference image, from among the plurality of candidate images.

(2) According to another aspect of the present invention attempting to solve the aforesaid problem, there is provided an image processing apparatus comprising: a extracting means for extracting a plurality of candidate images similar to a reference image from among a plurality of images by utilizing granulometry; a transforming means for transforming the plurality of candidate images on the basis of the reference image; a calculating means for calculating mutual information shared by each of the transformed candidate images and the reference image; and a selecting means for selecting a candidate image, which shares the largest amount of mutual information with the reference image, from among the plurality of candidate images.

According to the aspects (1) and (2) of the present invention, a plurality of candidate images similar to a reference image are extracted from among a plurality of images by utilizing granulometry. The candidate images are transformed based on the reference image. Mutual information shared by each of the transformed candidate images and the reference image is calculated. A candidate image that shares the largest amount of mutual information with the reference image is selected from among the plurality of candidate images. Consequently, an image closest to the reference image can be extracted from among the plurality of candidate images.

Preferably, the transformation includes matching of magnifications so that the transformation can be achieved effectively.

Preferably, the transformation includes alignment of barycenters so that the transformation can be achieved effectively.

Preferably, both the reference image and candidate images are medical images so that diagnosis can be achieved based on a synthetic image.

Therefore, the present invention provides a method and a apparatus capable of extracting an image closest to a reference image from among a plurality of candidate images.

Further objects and advantages of the present invention will be apparent from the following description of the preferred embodiments of the invention as illustrated in the accompanying drawings.

DETAILED DESCRIPTION OF THE INVENTION

Figure 1:
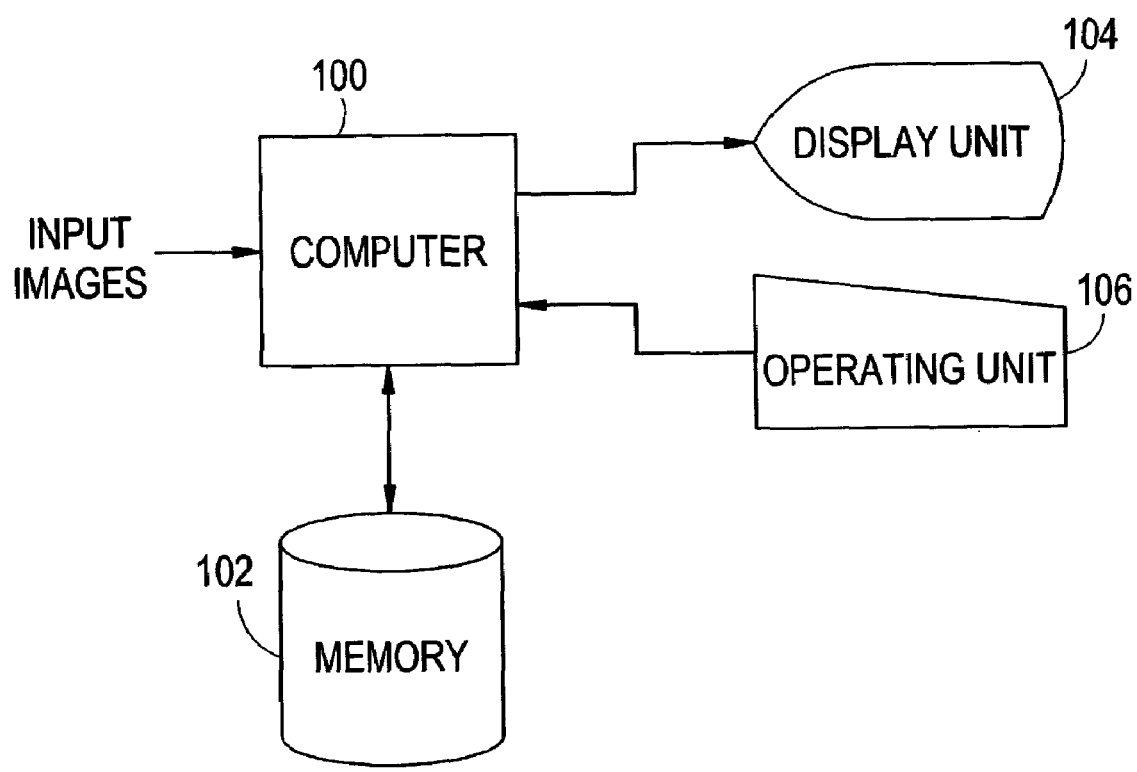
FIG. 1 is a block diagram of a apparatus of an example of an embodiment of the present invention.

Referring to drawings, an embodiment of the present invention will be described below. FIG. 1 is a block diagram of an image processing apparatus. The present apparatus is an example of an embodiment of the present invention. The configuration of the present apparatus presents an example of an embodiment of an image processing apparatus in which the present invention is implemented. Actions to be performed by the present apparatus present an example of an embodiment of an image processing method in which the present invention is implemented.

As shown in FIG. 1, the present apparatus includes a computer 100. The computer 100 receives images to be processed. The computer 100 includes a memory 102 in which the received images are stored. Various kinds of data and various programs that are used by the computer 100 are stored in the memory 102. When the computer 100 runs the programs stored in the memory 102, various procedures of image data processing are carried out.

The computer 100 also includes a display unit 104 and an operating unit 106. An image and other information provided by the computer 100 are displayed on the display unit 104. A user handles the operating unit 106, and various instructions and information are transferred from the operating unit 106 to the computer 100. The user uses the display unit 104 and operating unit 106 to operate the image processing apparatus interactively.

Figure 2:
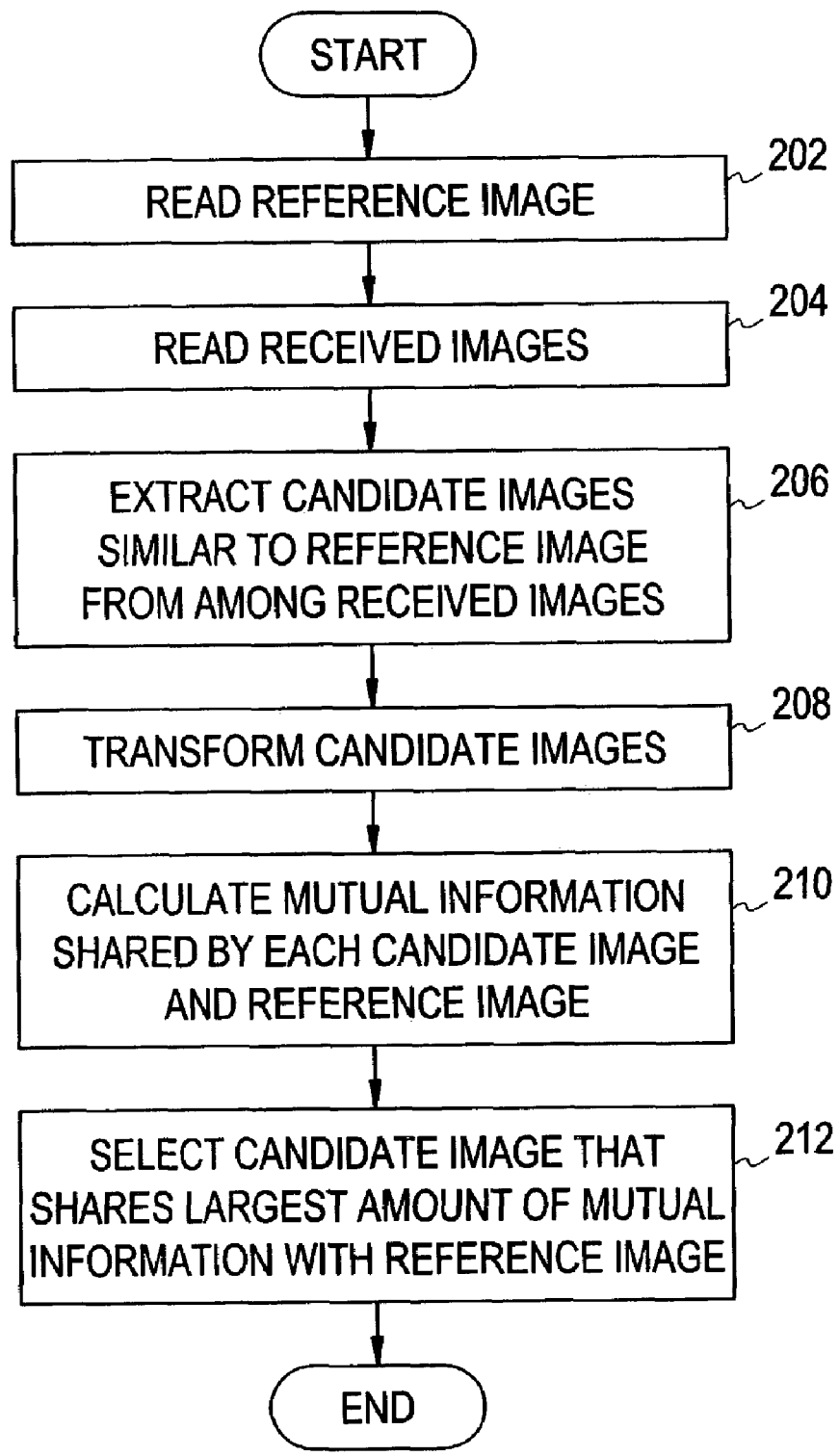
FIG. 2 is a flowchart describing actions to be performed by the apparatus of the example of the embodiment of the present invention.

Actions to be performed by the present apparatus will be described below. FIG. 2 is a flowchart describing the actions. The actions of the present apparatus are performed when the computer 100 runs a program stored in the memory 102.

Figure 3A:
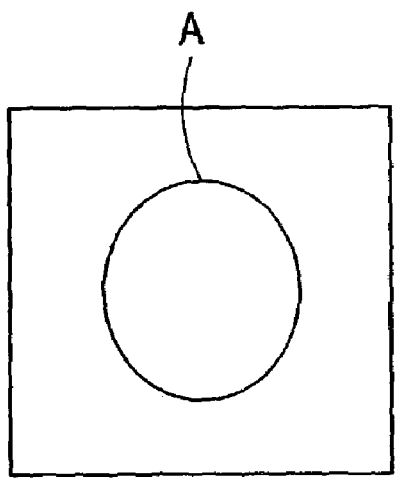
FIG. 3 is a conceptual diagram showing image frames.

As illustrated, at step 202, a reference image is read. Consequently, for example, an image frame containing an image A shown in FIG. 3(a) is stored in the memory 102. The image A is, for example, a tomographic image of the head produced by a PET apparatus. The image A is a halftone image showing the function of the brain.

Figure 3B:
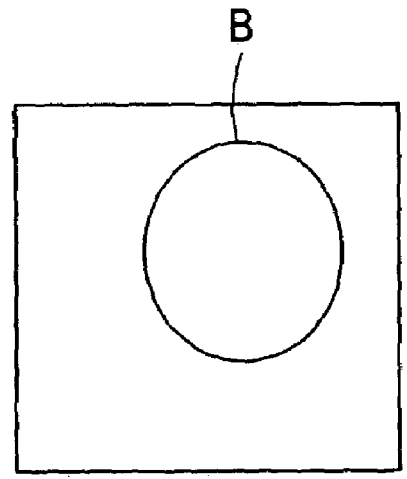

At step 204, received images are read. Consequently, for example, an image frame containing an image B shown in FIG. 3(b) is stored in the memory 102. The image B is, for example, a tomographic image of the head produced by an X-ray CT apparatus. The image B is a halftone image showing the structure of the cerebral parenchyma.

A plurality of images preserved in an external image file or the like are read. The plural images are different from one another in terms of, for example, a position of slicing.

At step 206, candidate images similar to the reference image are extracted from among the received images. For the extraction of the candidate images, granulometry that is a kind of morphological operation is utilized.

The granulometry is known as described in, for example, "Granulometry; Mathematical Morphology in Statistical Sense," Information statistics II, Lecture 5 (Nov. 10, 2000).

The granulometry is adapted to the reference image and the plurality of received images. As a result of the granulometry, a pattern spectrum is provided for each of the reference images and plurality of received images. The similarity between the pattern spectrum of each received image and the pattern spectrum of the reference image is checked. Received images whose pattern spectra are similar to the pattern spectrum of the reference image are extracted as candidate images. Thus, only the received images whose pattern spectra are similar to the pattern spectrum of the reference image are extracted in advance, whereby succeeding image processing is performed efficiently.

At step 208, the candidate images are transformed. The transformation is geometric transformation from the apparatus of coordinates for the candidate images to the apparatus of coordinates for the reference image. The transformation includes matching of magnifications and alignment of barycenters.

The matching of magnifications is the processing of matching the size of a candidate image with the size of the reference image as described below. First, the reference image and candidate image are binary-coded. The binary coding is such that as for the reference image that is the image A, among all pixels that constitute data of the image frame containing the image A, pixels whose values are equal to or larger than a predetermined threshold are set to 1s and pixels whose values fall below the threshold are set to 0s. As for the candidate image, among all pixels that constitute data of the image frame containing the image B, pixels whose values are equal to or larger than a predetermined threshold are set to 1s, and pixels whose values fall below the threshold are set to 0s.

Figure 4A:
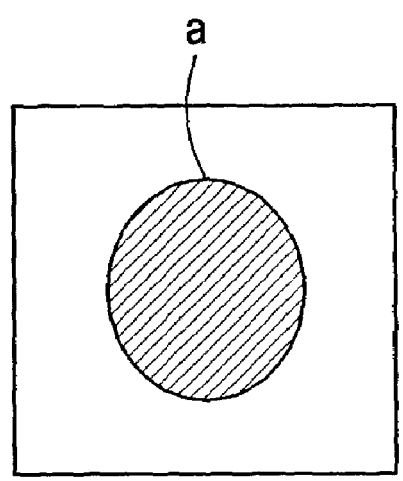
FIG. 4 is a conceptual diagram showing image frames.
Figure 4B:
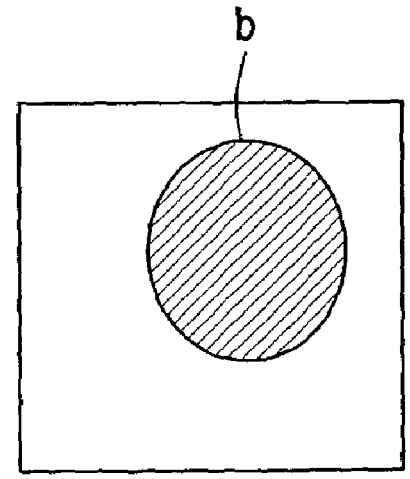

This results in, for example, image frames shown in FIG. 4(a) and FIG. 4(b). In the image frames, all the pixels constituting the data of the images a and b are set to 1s, and pixels constituting the data of the other portions are all set to 0s.

In general, the moment of an image is expressed as follows:

$$M(p,q) = \sum_{(i,j) \in S} i^p j^q \quad (6)$$

A magnification required to match the size of the image b with the size of the image a is given as follows:

$$k = \frac{M(0,0)a}{M(0,0)b} \quad (7)$$

where M(0,0) denotes the 0-order moment. The magnification k is calculated for each of the plurality of candidate images. The magnifications k are adapted to the candidate images, whereby the candidate images have the same size as the reference image.

In order to align barycenters with each other, the barycenters of the images a and b in the respective image frames are calculated. The barycentric coordinates (m,n) are calculated as follows:

$$m = M(1,0)/M(0,0) \quad (8)$$

$$n = M(0,1)/M(0,0) \quad (9)$$

where M(1,0) and M(0,1) denote first-order moments.

Figure 5A:
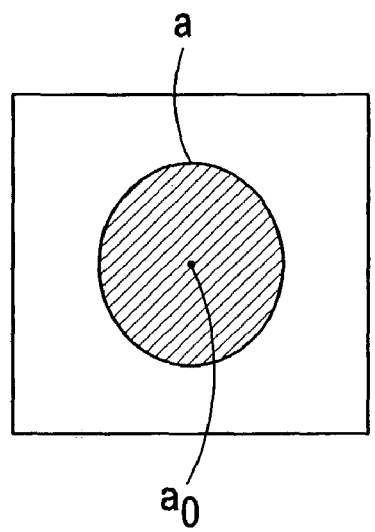
FIG. 5 is a conceptual diagram showing image frames.
Figure 5B:
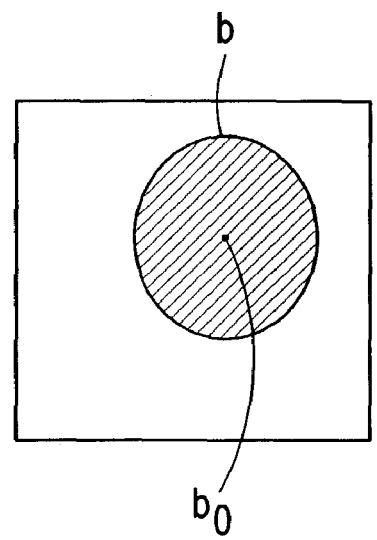

The above formulae are adapted to the image frames shown in FIG. 4(a) and FIG. 4(b), whereby the coordinates representing the barycenters a0 and b0 of the images a and b are determined as shown in FIG. 5(a) and FIG. 5(b). The barycenters are not only the barycenters of the images a and b but also the barycenters of the images A and B.

Figure 6:
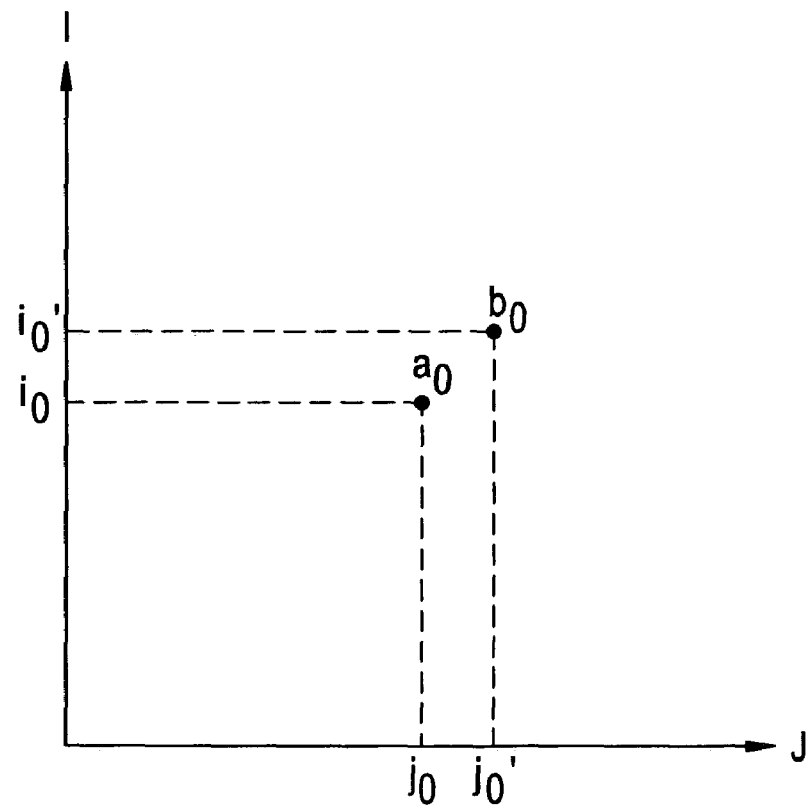
FIG. 6 shows coordinates representing barycenters in images.

Assuming that the coordinates representing the barycenters a0 and b0 of the images A and B are, for example, (i0,j0) and (i0',j0') as shown in FIG. 6, a magnitude of correction for the position of a barycenter is given as follows:

$$\Delta i = i_0 - i_0' \quad (10)$$

$$\Delta j = j_0 - j_0' \quad (11)$$

where $\Delta i$ denotes the magnitude of correction for the position of a barycenter in the direction of an I axis, and $\Delta j$ denotes the magnitude of correction therefor in the direction of a J axis. The magnitudes of correction for the position of a barycenter are calculated for each of the plurality of candidate images.

Figure 7:
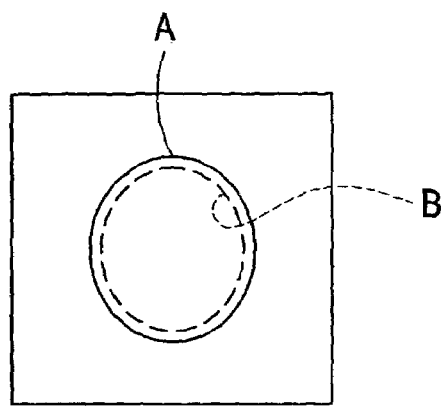
FIG. 7 is a conceptual diagram showing an image frame.

The foregoing magnification k and the magnitudes of correction for the position of a barycenter ($\Delta i, \Delta j$) which are calculated for each candidate image are adapted to each candidate image. Consequently, the plurality of candidate images is transformed into images defined in the same apparatus of coordinates as the reference image. Thus, the transformation is achieved. FIG. 7 illustratively shows the result of the transformation.

At step 210, mutual information shared by each candidate image and the reference image is calculated. Each candidate image to be subjected to this calculation is a transformed image.

In order to calculate mutual information, the entropy h(a) of the reference image is calculated. The entropy h(b) of each candidate image is calculated. A joint entropy h(a,b) that is a combination of the entropy of each candidate image and the entropy of the reference image is determined. Using the entropies, mutual information is calculated as follows:

$$MI(a, b) = h(a) + h(b) - h(a,b) \quad (12)$$

The mutual information is determined for each of the plurality of candidate images. Since the plurality of candidate images is transformed images, mutual information shared by each candidate image and the reference image can be determined under the same geometric conditions.

Whether the amount of mutual information is large or small indicates a degree of approximation to which each candidate image approximates the reference image. Since the plurality of candidate images meets the same geometric conditions as the reference image, whether the amount of mutual information is large or small indicates a degree of approximation to which each candidate image approximates the reference image. Consequently, a candidate image sharing the largest amount of mutual information with the reference image is an image closest to the reference image.

At step 212, a candidate image sharing the largest amount of mutual information is selected. Consequently, an image closest to the reference image is selected from among the candidate images. The image has the highest possibility that it may result from visualization of the same section of a patient body as the reference image does. Since the selected candidate image has already been transformed, registration has also been completed.

Generally, the received images include an image that results from visualization of the same section of a patient body as the reference image does. Therefore, the desired image is automatically extracted through the aforesaid processing, and registration is automatically completed.

Figure 8:
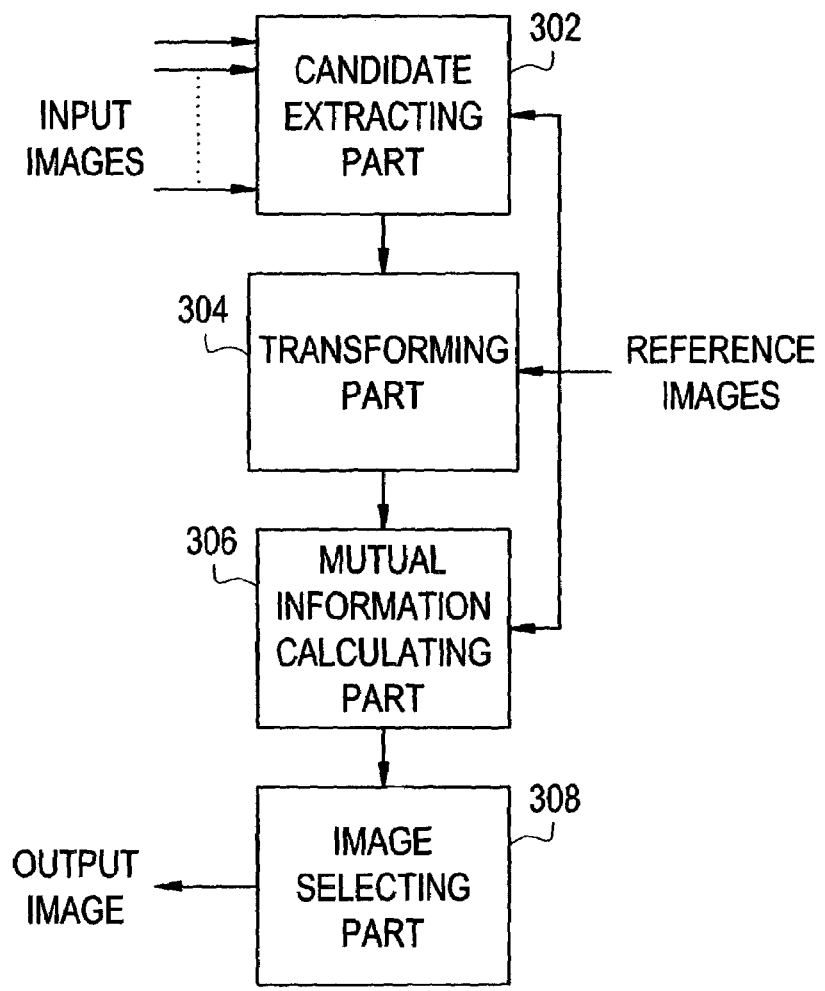
FIG. 8 is a functional block diagram showing the apparatus of the example of the embodiment of the present invention.

FIG. 8 is a functional block diagram of the present apparatus performing the aforesaid actions. As illustrated, the present apparatus includes a candidate extracting part 302, a transforming part 304, a mutual information calculating part 306, and an image selecting part 308.

The candidate extracting part 302 extracts a candidate image similar to a reference image from among a plurality of received images. This functional block performs the processing equivalent to step 206. The candidate extracting part 302 is an example of an extracting means included in the present invention.

The transforming part 304 transforms each candidate image. This functional block performs the processing equivalent to step 208. The transforming part 304 is an example of a transforming means included in the present invention.

The mutual information calculating part 306 calculates mutual information shared by each candidate image and the reference image. This functional block performs the processing equivalent to step 210. The mutual information calculating part 306 is an example of a calculating means included in the present invention.

The image selecting part 308 selects a candidate image that shares the largest amount of mutual information with the reference image. This functional block performs the processing equivalent to step 212. The image selecting part 308 is an example of an image selecting means included in the present invention.

Described above is a case where an image closest to an image produced by a PET apparatus is extracted from among a plurality of images produced by an X-ray CT apparatus. The present invention is not limited to the images produced by the X-ray CT apparatus and PET apparatus but also applies to medical images produced by other modalities. Even in the case where the medical images produced by the other modalities are employed, an image produced by one modality and closest to an image produced by the other modality can be extracted in the same manner as mentioned above. Moreover, the present invention can apply not only to two-dimensional images but also to three-dimensional images. Moreover, needless to say, the images are not limited to the medical images.

Many widely different embodiments of the invention may be configured without departing from the spirit and the scope of the present invention. It should be understood that the present invention is not limited to the specific embodiments described in the specification, except as defined in the appended claims.

The invention claimed is:

1. An image processing method comprising using a processor configured to:
    adapt a reference image and a plurality of images for a granulometric analysis;
    obtain a pattern spectrum of the reference image from the granulometric analysis;
    check for a similarity between the pattern spectrum and each of the plurality of images;

extract a plurality of candidate images that are similar to the reference image from the plurality of images based on the granulometric analysis;

transform the extracted plurality of candidate images on the basis of the reference image;

calculate mutual information shared by each of the plurality of transformed candidate images and the reference image; and select a candidate image, which shares a largest amount of mutual information with the reference image, from among the plurality of transformed candidate images.

2. The image processing method according to claim 1, wherein said transform the extracted plurality of candidate images on the basis of the reference image includes matching of magnifications by matching a size of each of the extracted plurality of candidate images with a size of the reference image.

3. The image processing method according to claim 1, wherein said transform the extracted plurality of candidate images on the basis of the reference image includes alignment of barycenters by aligning a barycenter of each of the extracted plurality of candidate images with a barycenter of the reference image.

4. The image processing method according to claim 1, wherein the reference image and the plurality of candidate images are medical images.

5. An image processing apparatus comprising:

an adapting device configured to adapt reference image and a plurality of images for a granulometric analysis;

an obtaining device configured to obtain a pattern spectrum of the reference image from the granulometric analysis;

a checking device configured to check for a similarity between the pattern spectrum and each of the plurality of images;

an extracting device configured to extract a plurality of candidate images that are similar to the reference image from among the plurality of images based on the granulometric analysis;

a transforming device configured to transform the plurality of extracted candidate images on the basis of the reference image;

a calculating device configured to calculate mutual information shared by each of the plurality of transformed candidate images and the reference image; and a selecting device configured to select a candidate image, which shares a largest amount of mutual information with the reference image, from among the plurality of transformed candidate images.

6. The image processing apparatus according to claim 5, wherein said transforming device is further configured to match magnifications by matching a size of each of the extracted plurality of candidate images with a size of the reference image.

7. The image processing apparatus according to claim 5, wherein said transforming device is further configured to align barycenters by aligning a barycenter of each of the extracted plurality of candidate images with a barycenter of the reference image.

8. The image processing apparatus according to claim 5, wherein the reference image and the plurality of candidate images are medical images.

* * * * *